United States Patent [19]
Vergona

[11] Patent Number: 5,661,545
[45] Date of Patent: Aug. 26, 1997

[54] STRIP RECORDING MEDIA EXPOSURE USING A ROTATING DRUM RECORDER

[75] Inventor: Albert B. Vergona, Rochester, N.Y.

[73] Assignee: Eastman Kodak Company, Rochester, N.Y.

[21] Appl. No.: 638,901

[22] Filed: Apr. 24, 1996

[51] Int. Cl.⁶ .......................... G03B 27/48; G03B 27/50
[52] U.S. Cl. .................. 355/47; 355/48; 355/50; 355/72; 355/77
[58] Field of Search .................. 355/47, 48, 50, 355/72, 77; 352/222, 228, 548; 346/138; 347/262, 264; 242/538.2

[56] References Cited

U.S. PATENT DOCUMENTS

| | | | |
|---|---|---|---|
| Re. 28,255 | 11/1974 | Aughton | 355/48 |
| 3,141,397 | 7/1964 | McNeil | 95/15 |
| 3,737,225 | 6/1973 | Aughton | 355/48 |
| 4,068,942 | 1/1978 | Penwell | 355/16 |
| 4,341,464 | 7/1982 | Vola | 355/16 |
| 4,631,551 | 12/1986 | Vergona | 346/108 |
| 4,796,061 | 1/1989 | Ikeda et al. | 355/73 |
| 4,916,367 | 4/1990 | Yamaguchi et al. | 355/48 |
| 5,109,374 | 4/1992 | Tsunoda et al. | 346/138 |
| 5,220,356 | 6/1993 | Yaginuma | 346/108 |
| 5,521,629 | 5/1996 | Deboer et al. | 347/262 |

Primary Examiner—R. L. Moses
Assistant Examiner—Shival Virmani
Attorney, Agent, or Firm—Milton S. Sales

[57] ABSTRACT

A rotating drum recorder includes a rotatable mounted drum having a cylindrical outer surface and an internal cavity adapted to receive a strip of light-sensitive recording material. An exposure gate defines (1) an aperture extending through the cylindrical outer surface of the drum and (2) a radially inwardly-facing media-locating surface. A drive mechanism is adapted to transport a received strip of light-sensitive recording material through the exposure gate internal to the cylindrical outer surface of the drum, whereby centrifical force on the strip of light-sensitive recording material acts to press the strip of light-sensitive recording material against the media-locating surface of the exposure gate as the drum rotates. The exposure source includes a source of a collimated light beam and an electro-optic modulator between the source and the drum surface for varying the intensity of the collimated light beam. The modulator may include a lanthanum-doped lead zirconate titanate material, an LED light source, or a laser source. The internal cavity is adapted to receive a light-tight media container of light-sensitive recording media. The drive mechanism is located within the drum, and includes an electric storage battery within the drum. The drive mechanism is adapted to pull the recording media through the exposure gate away from the media-locating surface during transport.

8 Claims, 4 Drawing Sheets

STRIP RECORDING MEDIA EXPOSURE USING A ROTATING DRUM RECORDER

BACKGROUND OF THE INVENTION

1. Technical Field

This invention relates generally to recorders for forming images on strip recording media such as for example silver or non-silver, light sensitive film and the like; and more specifically to such recorders having a rotating drum which carries the media past exposing optics.

2. Background Art

Rolls of strip film has been used for years as the preferred medium for photographically recording digital images. Cathode ray tubes (CRT's) are commonly used as the exposing mechanism used for low-resolution imagery because CRT's provided a simple, reliable method for modulating a light beam which is scanned across a stationary section of film. While this technology continues to be used for low-resolution imagery, there exists a number of physical factors of the CRT method that limits its performance for high quality digital images.

The CRT has a thin coating of phosphor that emits photons when irradiated by an electron beam. Because of the high external pressure on the CRT, the face plate thickness must be at least approximately 1 cm. thick. This thickness causes multiple surface reflections of the photons which reflect back to the phosphor causing secondary emissions. This effect manifests as a halo around the CRT beam which consequently causes a "flare" effect in the exposed image. The flare problem limits the maximum amount of light to the film, thereby limiting the exposure range of the CRT system.

Other drawbacks of CRT systems include changes in the beam shape as the beam is deflected across the face plate, graininess of the phosphor which is imaged onto the film, and off-axis optical imaging resulting in reduced image sharpness at the periphery of the image. Dust attraction due to the high electrostatic field at the surface of the face plate also presents a problem.

The CRT exposure problems of poor exposure range and image sharpness are overcome by the use of electro-optic modulators as the primary means to vary the intensity of collimated light beams that are scanned across the surface of a light sensitive recording medium. Commonly assigned U.S. Pat. No. 4,631,551 discloses such a color imaging apparatus wherein the material used in the electro-optic modulators is lanthanum-doped lead zirconate titanate (PLZT). This technology is best suited for rotating drum type film recorders.

Rotating drum recorders are well known. Conventionally, the light sensitive recording medium is wrapped about the outer cylindrical surface of the drum, as shown in FIG. 1, and is exposed by a light source external to the drum. A modulated light beam from a focusing lens 22 passes through an aperture 24 and is collected by a lens 28. Lens 28 focuses this light beam as a spot on the surface of a light sensitive member disposed on a drum 30. Drum 30 is translated a lead screw 31 which is driven by a stepper motor 31a controlled by a microprocessor 33.

Conventional rotating drum recorders must be loaded in the dark or in "safe light" conditions. The outer cylindrical surface of the drum can be very accurately produced, but the varying thickness of the media will adversely effect the focus of the system, since it is the back side of the medial that is controlled by the drum surface, not the front, light sensitive side.

DISCLOSURE OF THE INVENTION

It is an object of the present invention to provide a drum recorder with a cylindrical cassette mechanism that can be loaded with a roll of strip recording media.

It is another object of the present invention that the recording media be loadable into a cassette under ambient light condition, relying on the light tight container to protect the unexposed recording media.

It is still another object of the present invention that the media rest its recording side against a media-locating surface of an exposure gate so that the focal length of the exposure optics is maintained at a constant distance regardless of the thickness of the film base.

It is yet another object of the present invention that centrifugal force drives the recording media towards the media-locating surface, eliminating any focus problems due to recording media lift up.

It is still another object of the present invention that the cassette be self powered, whereby the recording media can be advanced and rewound while the cassette is rotating so as to not degrade productivity by having to stop the cassette to advance the recording media to the next frame.

It is yet another object of the present invention to inhibit emulsion surface scratches on the recording media by driving the back side of the recording media against a platen as the recording media is advanced. Once the recording media is advanced an appropriate distance, sufficient slack is provided such that centrifugal force will drive the recording surface of the media against the gate.

According to these and other objects, a rotating drum recorder includes a rotatable mounted drum having a cylindrical outer surface and an internal cavity adapted to receive a strip of light-sensitive recording material. An exposure gate defines (1) an aperture extending through the cylindrical outer surface of the drum and (2) a radially inwardly-facing media-locating surface. A drive mechanism is adapted to transport a received strip of light-sensitive recording material through the exposure gate internal to the cylindrical outer surface of the drum, whereby centrifugal force on the strip of light-sensitive recording material acts to press the strip of light-sensitive recording material against the media-locating surface of the exposure gate as the drum rotates.

According to a preferred embodiment of the present invention, the exposure source includes a source of a collimated light beam and an electro-optic modulator between the source and the drum surface for varying the intensity of the collimated light beam. The modulator may include a lanthanum-doped lead zirconate titanate material. Other light sources, such as LED or laser sources may be used.

According to another feature of the preferred embodiment of the present invention, the internal cavity is adapted to receive a light-tight media container of light-sensitive recording media. The drive mechanism is located within the drum, and includes an electric storage battery within the drum. The drive mechanism is adapted to pull the recording media through the exposure gate away from the media-locating surface during transport.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
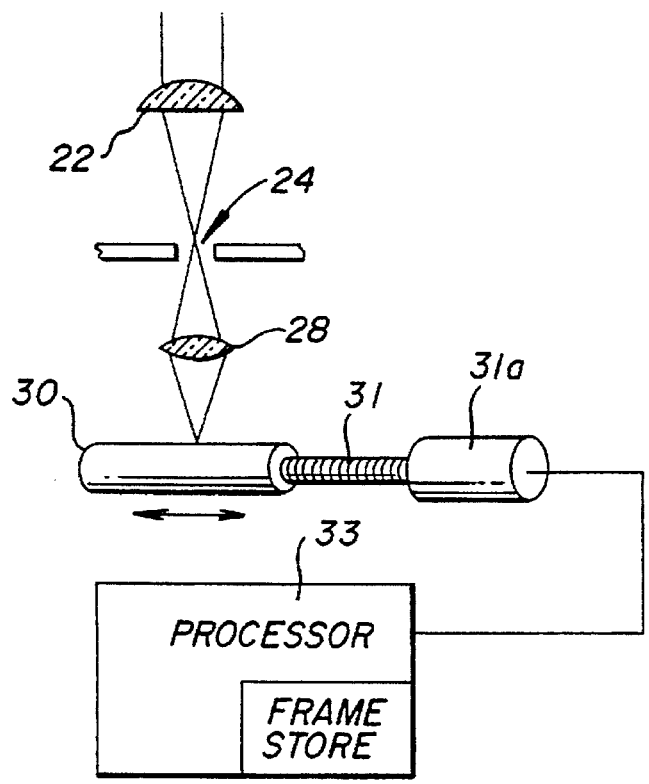
FIG. 1 is a schematic illustration of an imaging apparatus in accordance with the prior art.
Figure 2:
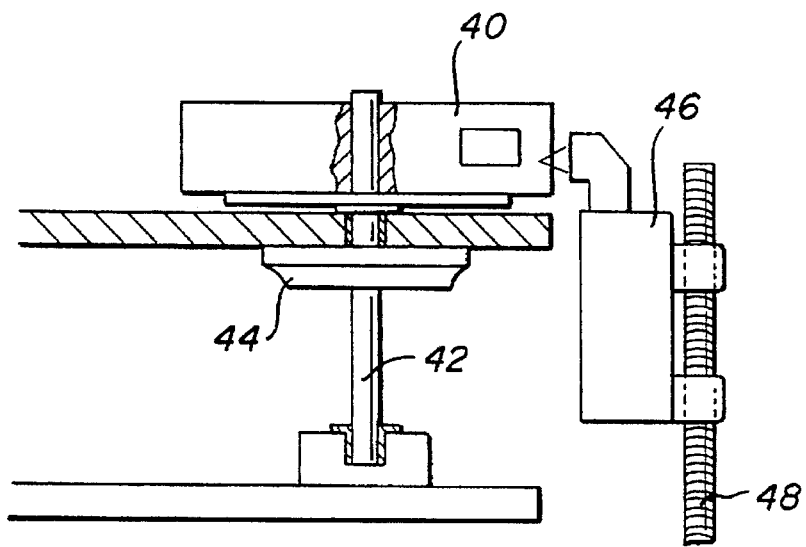
FIG. 2 is a schematic illustration of an imaging apparatus in accordance with the present invention.

Referring to FIG. 2, a cylindrical-shaped recording media cassette 40 is carried by a shaft 42 that is rotated by, say, a pancake motor 44. A collimated light beam from an optical head 46, such as one incorporating electro-optic modulator technology, is focused as a spot on the surface of a light sensitive member disposed in film cassette 40. Optical head 46 is translated by a lead screw 48 which is driven by a microprocessor-controlled stepper motor, not shown.

Figure 3:
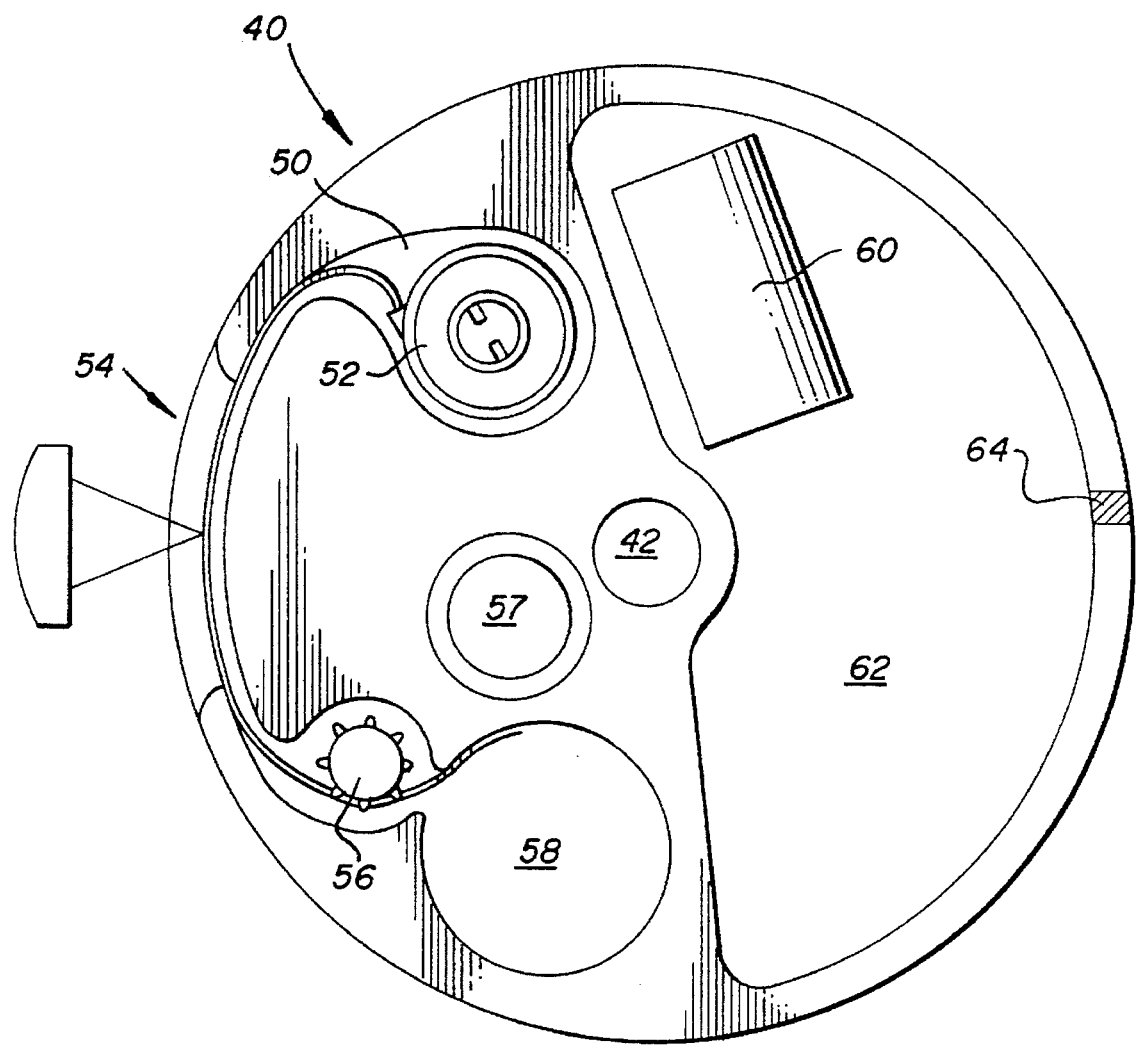
FIG. 3 is a sectional view schematically illustrating a cylindrical film cassette in accordance With the present invention.

FIG. 3 schematically illustrates the layout of components and the configuration of cassette 40. A cavity 50 receives a recording media container 52 such as for example a conventional cartridge loaded with edge-perforated 35 mm film. Other film formats, such as, say, 70 mm may be used. As illustrated, a leader has been drawn from container 52, fed though a gate 54, past a drive sprocket 56 to a take-up compartment 58.

During the exposure mode, the film is advanced to the next unexposed section by drive sprocket 56 and a motor 57 operatively connected to the drive sprocket. An exposing light beam is imaged through gate 54 as cassette 40 is rotating. The rotational speed of the cassette establishes what is commonly referred to as the fast scan direction, while the slow scan direction is accomplished by moving the optical exposing head one scan line width per rotation of the cassette.

Gate 54 may have a clear window against which the film is pressed by centrifugal force, or the gate may be open and rely on a media-locating surface such as a window frame or a pair of rails, not shown, to establish the position of the light sensitive surface of the film during exposure. In either event, by resting the emulsion side of the film against the inner frame of the exposing window, the focal length of the exposure optics is maintained at a constant distance regardless of the thickness of the film base. This is not true for films mounted on the outer surface of a prior art rotating drum since variations in base thickness will cause a film-dependent focus shift. Another benefit for referencing the focal plane to the gate window is that centrifugal force drives the film towards the window frame eliminating any focus problems due to film lift-up.

The cassette is self powered by a rechargeable battery 60 in a control electronics compartment 62. This allows the film to be advanced and rewound while the cassette is rotating. Film advance and rewind commands are transmitted to the cassette such as through LED infrared sensors or a Hall effect sensor 64. Thus, productivity will not be degraded by having to stop the cassette to advance the film to the next frame.

Figure 4:
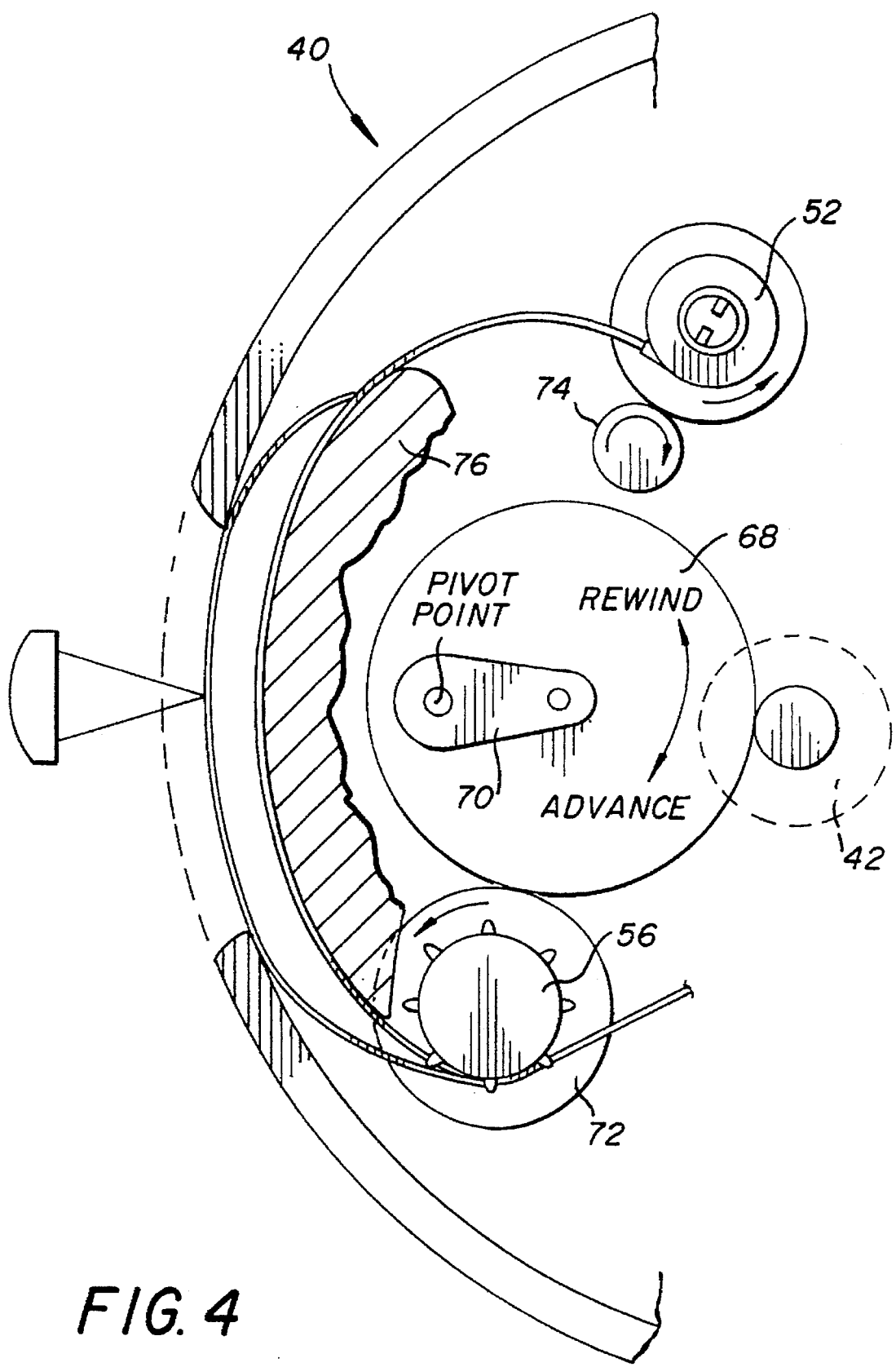
FIG. 4 is a sectional view schematically illustrating additional features of the cylindrical film cassette of FIG. 3.

Referring to FIG. 4, a simple gear mechanism between motor 42 and sprocket 56 is used to advance and rewind the film. Depending on the direction of rotation of the drive motor, a main gear 68 carried by a rocker arm 70 will engage a capstan 72 of drive sprocket 56 or a rewind gear 74.

When film is moved by mechanical means, emulsion surface scratches are always a concern. Addressing this problem, the film base is driven against a platen 76 by means of drive sprocket 56. Once the film has advanced an appropriate distance, capstan 72 is rotated in reverse a predetermined amount sufficient to provide slack in the film such that centrifugal force will drive the emulsion surface of the film against the film gate frame. The two film positions, against the platen and resting against the film gate frame, are illustrated in FIG. 3.

Figure 5:
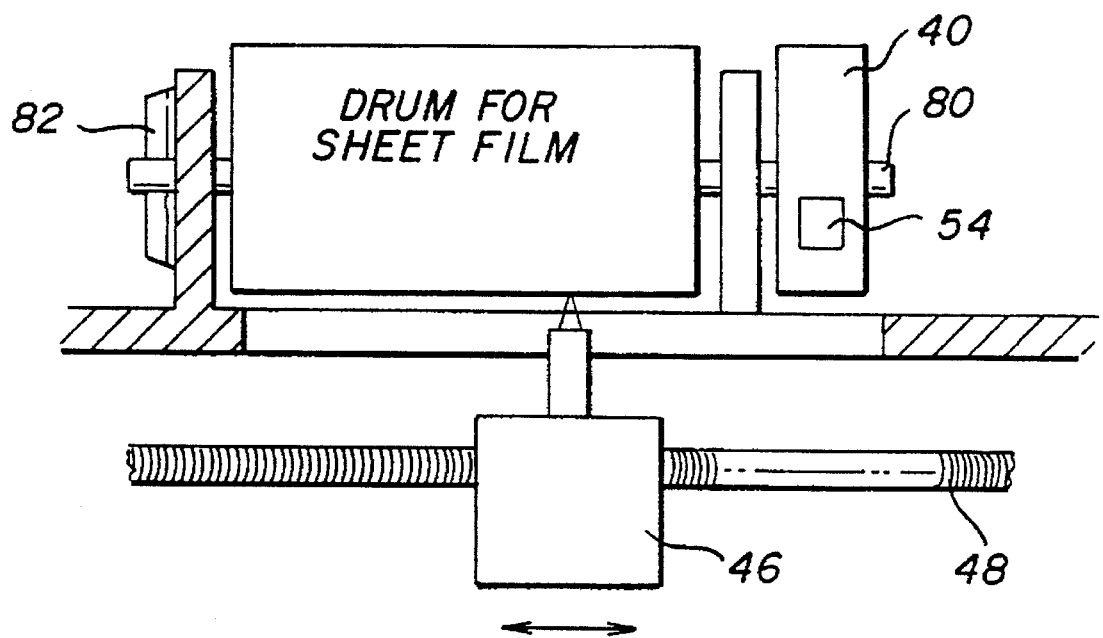
FIG. 5 is a schematic illustration of an imaging apparatus in accordance with another embodiment of the present invention.

FIG. 5 illustrates an embodiment of the present invention in which a film recorder is provided with the ability to accommodate exposing both sheet film and roll film. A single rotating shaft 80 driven by a motor 82 carries a conventional rotating drum for sheet film and a cassette 40 such as illustrated in FIGS. 2–4.

The invention has been described in detail with particular reference to preferred embodiments thereof, but it will be understood that variations and modifications can be effected within the spirit and scope of the invention.

What is claimed is:

1. A rotating drum recorder comprising:

a rotatable mounted drum having a cylindrical outer surface and an internal cavity adapted to receive a strip of light-sensitive recording material;

an exposure gate defining (1) an aperture extending through the cylindrical outer surface of the drum and (2) a radially inwardly-facing media-locating surface; and a drive mechanism adapted to transport a received strip of light-sensitive recording material through the exposure gate internal to the cylindrical outer surface of the drum, whereby centrifical force on the strip of light-sensitive recording material acts to press the strip of light-sensitive recording material against the media-locating surface of the exposure gate as the drum rotates.

2. A rotating drum recorder as set forth in claim 1 wherein the exposure source comprises:

a source of a collimated light beam; and an electro-optic modulator between the source and the drum surface for varying the intensity of the collimated light beam.

3. A rotating drum recorder as set forth in claim 2 wherein the modulator includes a lanthanumdoped lead zirconate titanate material.

4. A rotating drum recorder as set forth in claim 2 wherein the modulator includes an LED light source.

5. A rotating drum recorder as set forth in claim 1 wherein the internal cavity is adapted to receive a light-tight media container of light-sensitive recording media.

6. A rotating drum recorder as set forth in claim 1 wherein the drive mechanism is located within the drum.

7. A rotating drum recorder as set forth in claim 6 wherein the drive mechanism includes an electric storage battery within the drum.

8. A rotating drum recorder as set forth in claim 1 wherein the drive mechanism is adapted to pull the recording media through the exposure gate away from the media-locating surface during transport.

* * * * *

UNITED STATES PATENT AND TRADEMARK OFFICE
CERTIFICATE OF CORRECTION

PATENT NO. : 5,661,545
DATED : August 26, 1997
INVENTOR(S) : Albert B. Vergona

It is certified that error appears in the above-identified patent and that said Letters Patent is hereby corrected as shown below:

On the title page, after item [22] insert the following: -- [60] Provisional application No. 60/000,661, June 29, 1995--

In column 1, line 3, after the title insert the following: --This application claims the benefit of U. S. provisional applciaiton No. 60/000,661, June 29, 1995--

Column 4, line 48, delete "lanthanumdoped" and insert -- lanthanum-doped--.

Signed and Sealed this

Second Day of December, 1997

Attest:

BRUCE LEHMAN

Attesting Officer

Commissioner of Patents and Trademarks